Patented Feb. 15, 1938

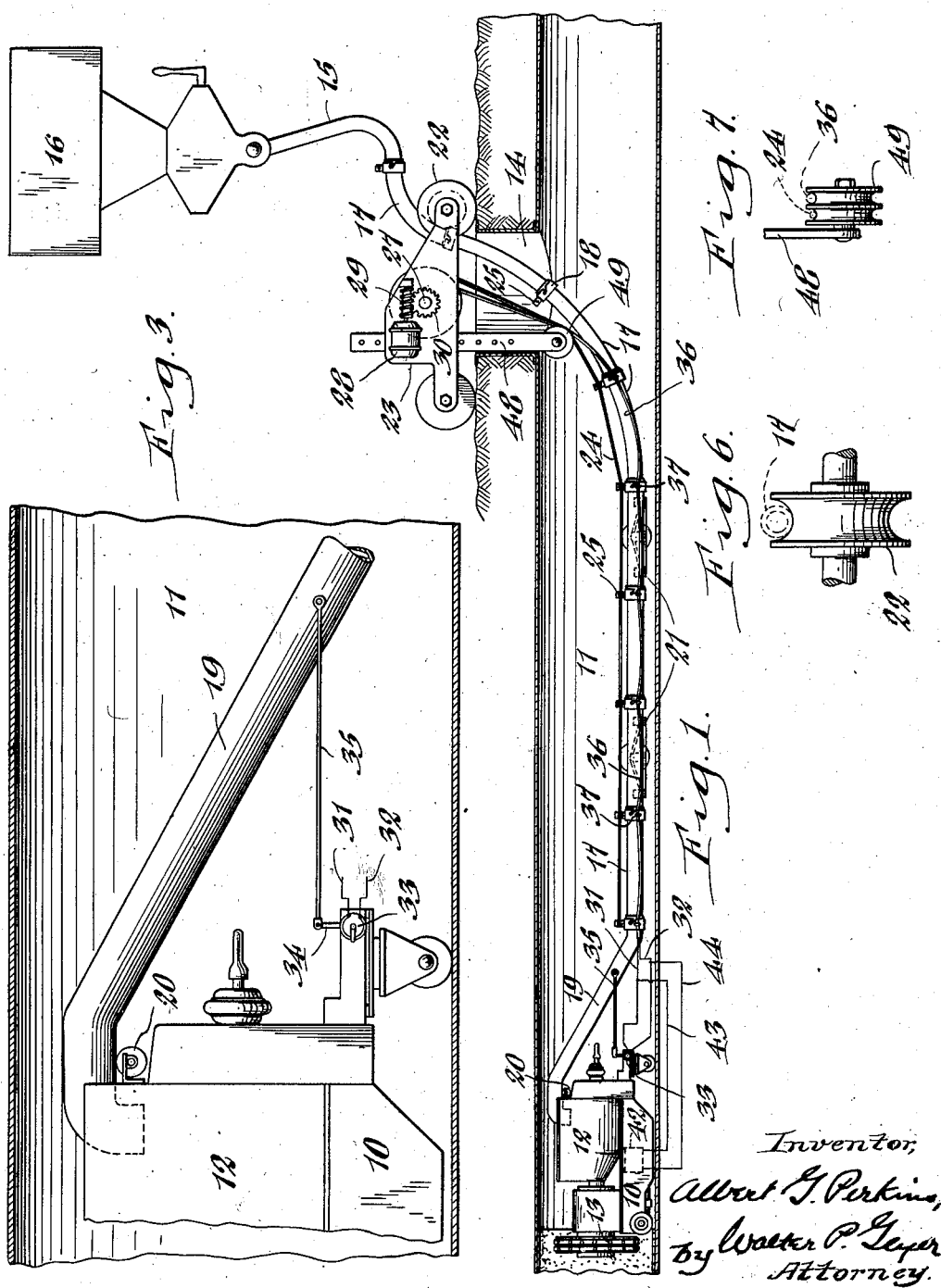

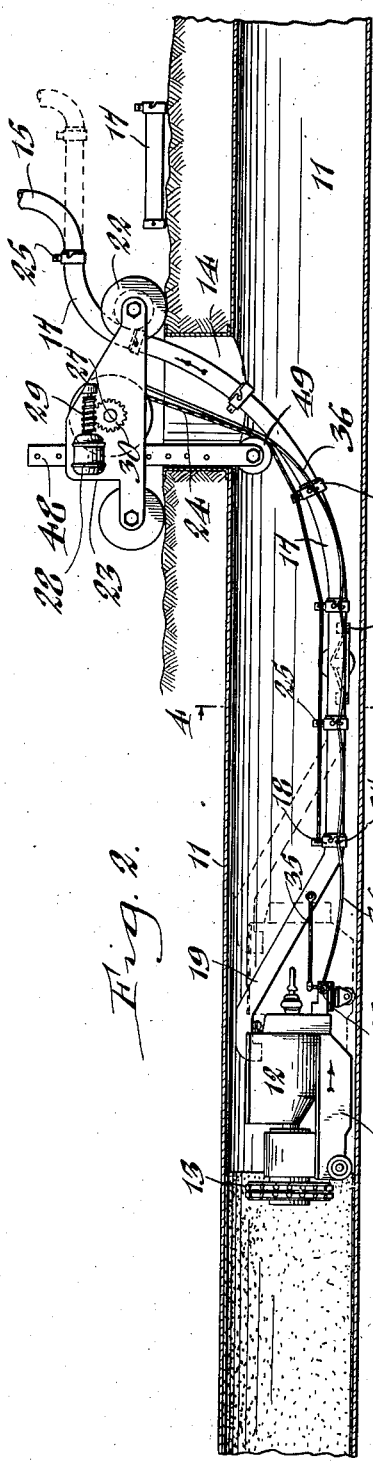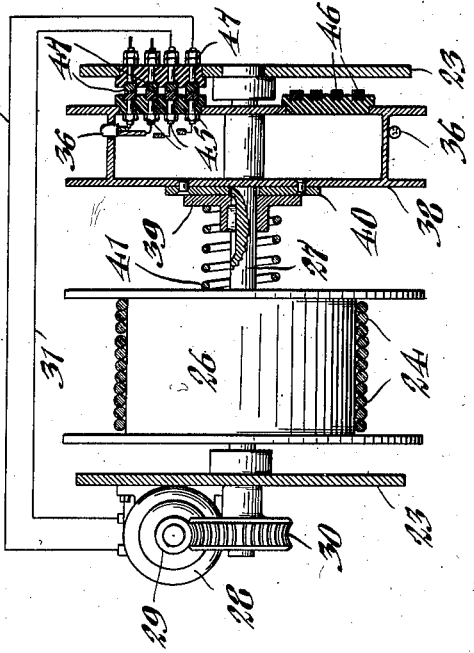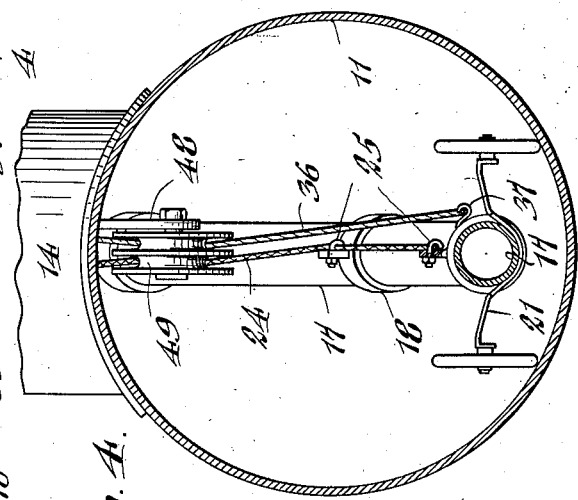

2,108,319

UNITED STATES PATENT OFFICE 2,108,319

FEED APPARATUS FOR PIPE COATING MACHINES AND THE LIKE

Albert G. Perkins, Warsaw, N. Y.

Application September 16, 1935, Serial No. 40,679

8 Claims. (Cl. 91—18)

This invention relates generally to improvements in the art of coating or lining the inner walls of pipe lines, conduits and the like, but more particularly to a novel feed means for conveying the coating material to the apparatus for applying it to the pipe walls as it travels through the pipe line.

One of the objects of the invention is the provision of a traveling feed pipe line for operative connection at one end to a coating apparatus within the pipe line to be treated and connected at its opposite end exteriorly of the pipe line being coated with the source of coating material.

Another object is to provide a feeding means of this character comprising a traveling pipe line composed of a plurality of detachable pipe-sections and means for pulling or drawing the same from the pipe line being coated simultaneously with the movement of the coating apparatus through the pipe-line.

A still further object of the invention is to provide a sectional feed pipe which is so designed as to be readily shortened or lengthened in accordance with the travel of the coating machine through the pipe line being coated and in accordance with a given location of the source or supply of the coating material.

Other features of the invention reside in the construction and arrangement of parts hereinafter described and particularly pointed out in the appended claims.

In the accompanying drawings:—

Figure 1 is a side elevation of a pipe coating machine shown with a pipe line and depicting my improved feed means operatively connected thereto, the parts being shown at the start of the feed operation with the maximum length of feed pipe-sections between the coating machine and the source of supply. Figure 2 is a similar view showing the position of the parts after the coating machine has traveled to some extent through the pipe line and accordingly effected a shortening of the feed line. Figure 3 is a fragmentary side view showing the operative connection between the discharge end of the feed line and the coating machine. Figure 4 is an enlarged cross section taken on line 4—4, Figure 2. Figure 5 is an enlarged sectional elevation of the windlassing unit and associated parts for pulling the feed line through the pipe line being coated. Figure 6 is a detail view of the hose-guide roller. Figure 7 is a detail view of the draw cable and wire cable guide roller.

Similar characters of reference indicate corresponding parts throughout the several views.

By way of example, my improved feed apparatus has been shown in connection with a machine for applying a protective coating or lining of plastic material, such as concrete, to the inner walls of pipe lines, conduits and the like. The coating machine may be of any suitable and well known construction and as illustrated in Figures 1 and 2, it consists of a wheeled carriage 10 which is adapted to be propelled through the pipe line 11 by appropriate transmission means and which is provided with a hopper or container 12 for the coating material, and a revolving dispensing or discharge head 13 mounted at the front end of the carriage axially of the pipe and into which the material is delivered from the hopper and from which it is discharged by centrifugal force onto the pipe wall. As the coating machine travels through the pipe line or conduit, my feed apparatus or conveying unit functions to keep it supplied with coating material, being in the form of a hose or tube which is disposed forwardly or in advance of and in tandem-like communicating relation at its rear or discharge end with the machine-hopper 12 and whose opposite or inlet end is adapted to extend through an adjoining manhole 14, connecting the pipe line with the ground level to a point externally of the pipe-line for detachable operative connection to the discharge tube 15 of a concrete supply and pumping unit 16 depicted in Figure 1. This supply unit, which forms no part of my invention, may be of any suitable construction, the same being usually mounted on a wheeled truck to be readily moved from place to place or from one zone or site to another to supply the material for use along the pipe line.

The conveying unit which is operatively coupled with the coating machine to continuously feed the material thereto as it travels through the pipe line to be coated or lined, is preferably constructed as follows:—

The numeral 17 indicates a plurality of hose-sections of suitable lengths which are detachably coupled one to another by suitable couplings 18, and 19 indicates a discharge pipe which is connected to the rearmost hose-section by a similar collar 18 and extends upwardly therefrom into communicating discharge relation with the hopper 12 of the coating machine. These hose-sections and discharge pipe move as a unit with the machine as it travels through the pipe line during the coating operation, the front end of the hose unit projecting upwardly and outwardly through the adjoining manhole opening 14 in the pipe line to a point externally of the latter where the foremost hose-section is detachably coupled by its coupling 18 with the discharge tube 15 of the concrete supply and pumping unit 16. The discharge end of the line 19 preferably hooks over the top front edge of the hopper 12 to normally maintain the conveyor unit in coupled engagement with the coating machine and yet permit a limited relative displacement between them, the bottom side of said pipe having a horizontally-disposed portion which is supported on a guide roller 20 mounted on the front end of the coating machine. For facilitating the travel of the sectional-hose unit through the pipe, it may be removably supported at suitable intervals on wheeled trucks 21 which roll along the bottom wall of the pipe line during travel of the machine therethrough.

At its front or feed end the hose unit extends upwardly through the man-hole opening 14 and is guided in its movement therethrough over a grooved wheel 22 loosely mounted on the front axle of a portable device preferably consisting of a wheeled carriage 23, which, during the coating of a given stretch of the pipe line, occupies a stationary position on the ground level and substantially over the man-hole opening, as seen in Figures 1 and 2. When this stretch of pipe is coated, the carriage 23 is shifted to the next man-hole opening for properly guiding the hose-sections 17 during the feeding of the material to the coating machine while treating the next length or stretch of the pipe line.

The hose unit is provided with its own drive or propelling means for drawing or pulling it through the pipe simultaneously and at a speed synchronized with that of the coating machine, and to this end I provide a draw cable 24 releasably connected to the collars 18 of the hose-sections 17 by suitable clamps 25 and to a windlass or drum 26 mounted on a driven shaft 27 journaled in the carriage 23. This shaft is driven at a relatively slow speed by an electric motor 28 through the medium of a worm 29 and worm wheel 30. Included in the wires 31, 32 of the motor circuit is a rheostat 33 which is mounted on the front end of the coating machine carriage 10 and whose actuating arm or lever 34 is connected by a link 35 with the discharge pipe 19 of the conveying hose 18. By this construction, the speed of the windlass motor 28 is controlled automatically by the rheostat 33 in accordance with the speed of travel of the coating machine whereby both units travel along at the same relative speed; should the coating machine, for example, momentarily speed up, the relative movement between it and the conveying unit will be transmitted to the rheostat-actuating link 35 and accordingly speed up the windlass-motor to in turn pull the conveying unit at the same relative speed as the coating machine. Should the coating machine slow down, then a reversal of these steps takes place to accordingly reduce the speed of the hose unit to that of the coating machine.

It is necessary that the wires 31, 32 included in the circuit of the rheostat-controlled windlass motor 28 be wound and unwound in accordance with the respective movements of the conveying hose and for this purpose these wires are preferably housed in a flexible cable or tubing 36 releasably coupled to suitable clamps 37 borne by the hose-couplings 18 and having its free end connected to a reel or pulley 38 preferably loosely mounted on the shaft 27 alongside the windlass 26. A friction disk 39 is feathered on said shaft and constantly urged toward a companion disk 40 on the face of the reel 38 by a spring 41, whereby said reel is normally compelled to turn with the windlass but is permitted to slip relatively thereto should the occasion warrant it, if, for example, the wire-carrying cable 36 be tightened about the reel. If desired, the coating machine may be driven by an electric motor 42 and its circuit wires 43, 44 may be housed in the cable 36. The respective circuit wires are connected at their reel-ends to companion contacts 45 thereon and these are in turn connected through collector rings 46 mounted on the reel to companion contacts 47 on the carriage 23 and connecting the wires to the source of current supply and to the windlass-motor 28.

For the purpose of effecting a direct and straight pull on the draw cable 24 to propel the conveying unit through the pipe line, I provide a vertically adjustable stabilizer arm 48 which extends downwardly through the man-hole opening 14 from the windlass carriage 23 and which is provided at its lower end with a grooved pulley 49 over which the draw cable 24, as well as the wire-receiving cable 36, is guided to the windlass-drum 26 and reel 38, respectively. In the operative position of the parts seen in Figures 1 and 2, the stabilizing arm abuts that wall of the man-hole opening nearest the coating machine, thereby serving the additional function of anchoring the carriage 23 in place during a pull on the draw cable.

In the operation of the apparatus, assuming a full length of the conveying unit hose-sections 17 to be properly coupled in the manner shown in Figure 1, the supply unit 16 is rendered operative to pump the concrete or mortar to the conveying unit and thence into the hopper 12 of the coating machine. The motors 42 and 28 of the coating machine and windlass 26, respectively, are now started and as the machine and conveying unit are simultaneously propelled through the pipe line, the mortar is directed by the discharge head 13 onto the pipe-wall. During this operation, the discharge tube 15 of the supply unit 16 is pushed or shifted by the traveling hose 17 from the position shown by full lines to that shown by dotted lines in Figure 2, and the draw cable 24 and the circuit-wire cable 36 are wound upon the respective drum 26 and reel 38. When the machine has traveled a distance, say equal to the length of a hose-section 17, that section attached to the discharge tube 15 is uncoupled therefrom and the adjoining hose-section, the front end portions of the cables 24 and 36 are disconnected from the companion clamps 25 and 37, and the discharge tube swung to the left and coupled with said adjoining hose-section. The apparatus is again started to coat another section of the pipe line and the procedure just described is repeated in an intermittent fashion until a length of pipe equivalent to the length of the conveying unit have been coated, after which the uncoupled hose-sections are again assembled in the next stretch of the pipe line and the carriage 23 is shifted to the next adjoining man-hole opening 14, the electrical connections to the coating machine motor 42 and rheostat 33 being temporarily disconnected for this purpose.

I claim as my invention:—

1. Apparatus of the type described, comprising a coating machine adapted to travel through a pipe line, propelling means thereon for causing its movement a flexible conveying tube movable within the pipe line and adapted for communication at its discharge end with the coating machine, the feed end of said tube extending externally of the pipe for connection to a material feed unit, said conveying tube being composed of a plurality of separable sections adapted to be successively uncoupled from the tube at its feed end to shorten the tube at predetermined intervals in accordance with the travel of the coating machine through the pipe line, and propelling means disposed externally of the pipe line and operatively connected to said conveying tube for drawing the latter through the pipe line at substantially the same speed as the coating machine.

2. Means for conveying material to a coating machine adapted to travel through a pipe line having man-holes therein, comprising a conveying hose movable through the pipe line in tandem relation to the machine and having one end detachably connected to a source of material supply and its other end in discharge relation to said machine, a portable device disposed externally of the pipe line adjacent a man-hole thereof and having guide means thereon for the adjoining end of the conveyor hose, drive means mounted on said device and operatively connected to said hose for drawing it through the pipe line, and control means for said drive means governed by the relative movements of the coating machine and the conveying unit for causing the latter to travel at the same speed as the former.

3. Means for conveying material to a coating machine adapted to travel through a pipe line having man-holes therein, comprising a conveying hose movable through the pipe line in tandem relation to the machine and having one end detachably connected to a source of material supply and its other end in discharge relation to said machine, a portable device disposed externally of the pipe line adjacent a man-hole thereof and having guide means thereon for the adjoining end of the conveyor hose, and drive means mounted on said device and operatively connected to said hose for drawing it through the pipe line, said drive means consisting of a windlass and a draw cable wound thereon and connected to the conveyor hose, an electric motor for the windlass, and a rheostat included in the circuit of the motor mounted on the coating machine and having an operative connection to the conveying hose.

4. Means for conveying material to a coating machine adapted to travel through a pipe line having man-holes therein, comprising a conveying hose movable through the pipe line in tandem relation to the machine and having one end detachably connected to a source of material supply and its other end in discharge relation to said machine, a portable device disposed externally of the pipe line adjacent a man-hole thereof and having guide means thereon for the adjoining end of the conveyor hose, drive means mounted on said device and including a draw cable connected to the conveying hose, and a stabilizing member pending from said portable device for abutting engagement with the man-hole wall and having a guide thereon for the draw cable.

5. Means for conveying material to a coating machine adapted to travel through a pipe line having man-holes therein, comprising a conveying hose movable through the pipe line in tandem relation to the machine and having one end detachably connected to a source of material supply and its other end in discharge relation to said machine, a portable device disposed externally of the pipe line adjacent a man-hole thereof and having guide means thereon for the adjoining end of the conveyor hose, a shaft journaled on said device and having a winding drum thereon, a draw cable connecting said drum with said conveying hose for pulling the latter through the pipe line simultaneously with the travel of the coating machine therethrough, an electric motor for driving said shaft, a rheostat included in the motor circuit mounted on the coating machine and having an operative connection to the conveying hose for regulating the speed of the motor in accordance with the speed of travel of the coating machine, a reel loosely mounted on said shaft for winding the circuit wires thereon and containing wire-engaging posts, relatively movable contacts on said reel and said portable device for maintaining a closed circuit during the rotation of the reel, and a slip clutch interposed between said shaft and said reel.

6. The combination with a pipe coating machine having propelling means thereon adapted to travel through a pipe line and having a hopper at one end for the coating material and an applicator at its opposite end for applying the material to the pipe wall, of means for feeding the material to the machine while in operation consisting of a flexible conveying tube movable within the pipe line in advance of the machine and in communicating relation at one end with the machine-hopper and adapted for connection at its opposite end externally of the pipe line with a source of coating material, and propelling means disposed externally of the pipe line and operatively connected to said tube to draw it through the pipe line as the coating machine travels therethrough.

7. The combination with a pipe coating machine adapted to travel through a pipe line and having a hopper at one end for the coating material and an applicator at its opposite end for applying the material to the pipe wall, of means for feeding the material to the machine while in operation consisting of a flexible conveying tube movable within the pipe line in advance of the machine and in communicating relation at one end with the machine-hopper and adapted for connection at its opposite end externally of the pipe line with a source of coating material, power-driven means operatively connected to said conveying tube for drawing it through the pipe substantially at the same speed as the coating machine, and control means for said power driven means governed by the movement of said machine for causing the conveying tube to travel at the same speed as the coating machine.

8. Apparatus of the type described, comprising a coating machine adapted to move through a pipe line, propelling means mounted on the coating machine for causing movement thereof, a flexible conveying tube movable within the pipe line and adapted for communication at its discharge end with the coating machine, the feed end of the tube extending externally of the pipe for connection to a material feed unit, and propelling means disposed externally of the pipe line and operatively connected to the tube to draw the latter through the pipe line as the treating machine moves therethrough.

ALBERT G. PERKINS.